Patented Oct. 9, 1923.

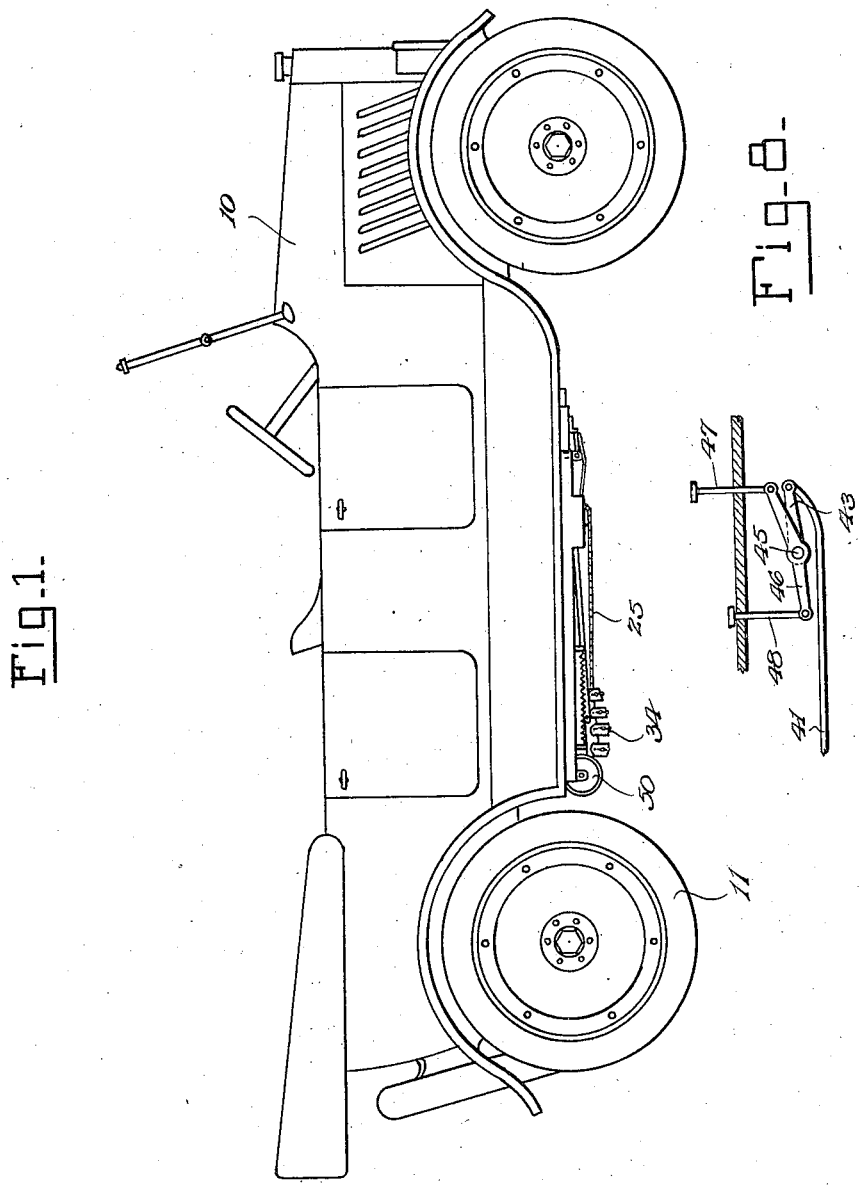

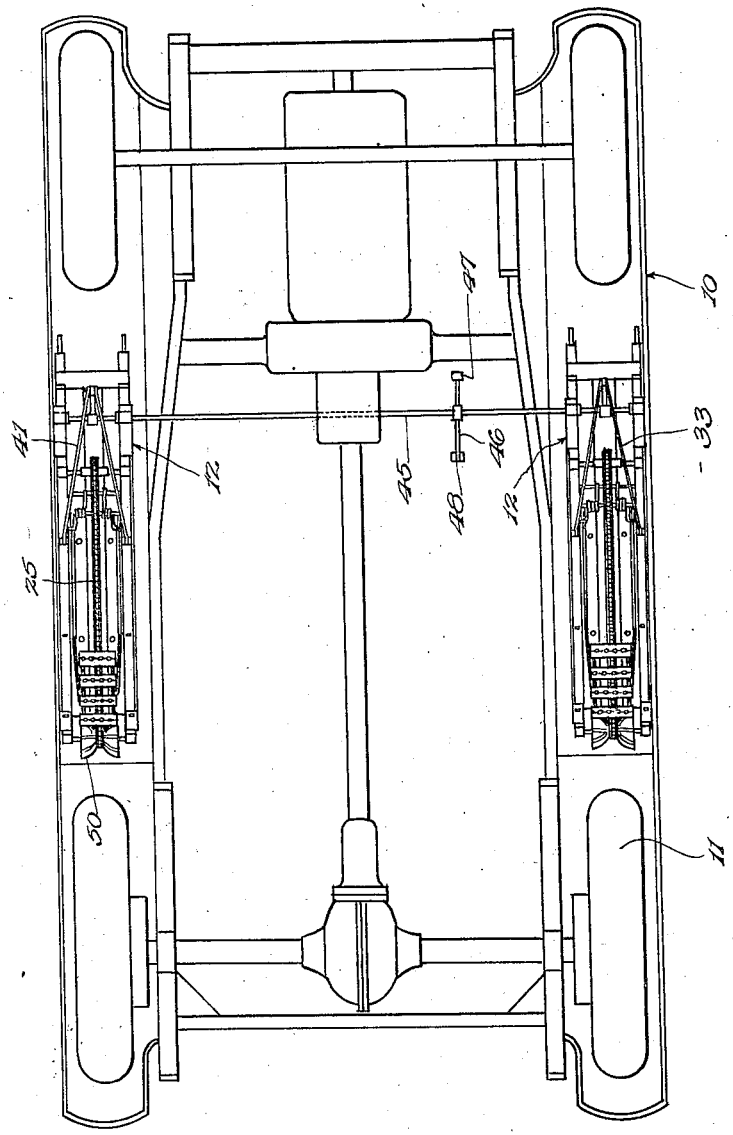

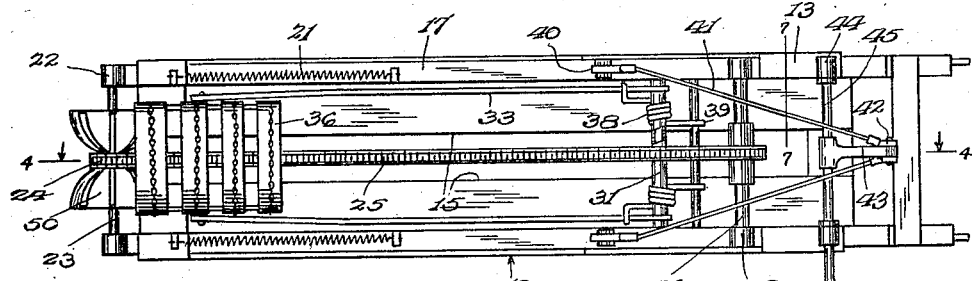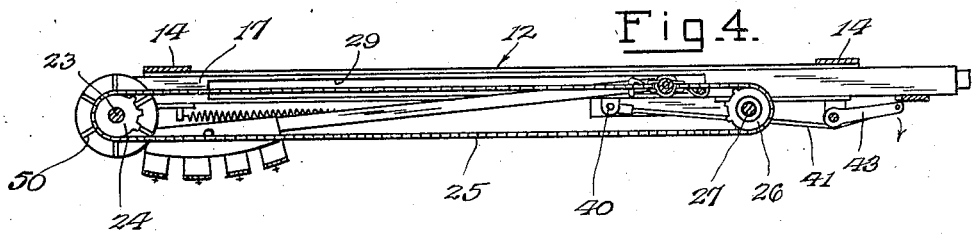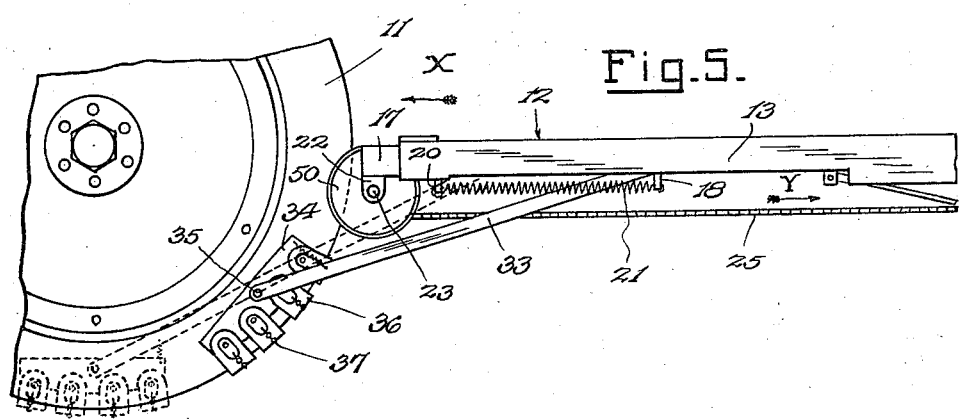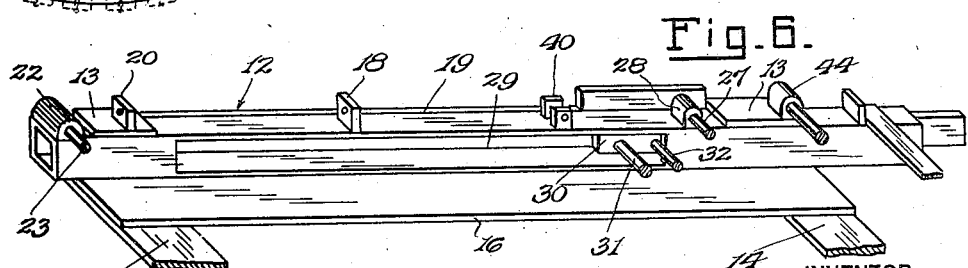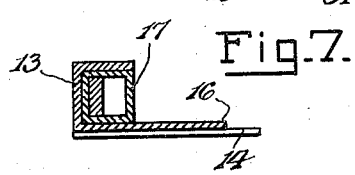

1,470,098

UNITED STATES PATENT OFFICE.

JAMES W. ORR, OF KANSAS CITY, MISSOURI.

EMERGENCY BRAKE FOR MOTOR VEHICLES.

Application filed November 13, 1922. Serial No. 600,517.

*To all whom it may concern:*

Be it known that I, JAMES W. ORR, a citizen of the United States, residing at Kansas City, in the county of Jackson and State of Missouri, have invented certain new and useful Improvements in Emergency Brakes for Motor Vehicles, of which the following is a specification.

The present invention relates to emergency brakes for wheeled vehicles in general, but more particularly to such brakes for automobiles. The main object of the invention is to provide, in addition to the ordinary wheel brake, an emergency brake, that is applied automatically to the vehicle wheels upon being released by the operator.

For this purpose this emergency brake is constructed in the form of skids or shoes, that are normally housed under the vehicle, and which are designed to engage between the wheels of an automobile and the roadway or between the wheels and the track when the device is used on street-cars or railroad-cars.

Another object of the invention resides in the fact that the car wheels are made to engage friction wheels carried by the emergency brake, so that in this manner the car wheels themselves will apply the brake, and that all the driver has to do, is to press with his foot on the treadle and in this manner release the emergency brake.

One embodiment of the invention is illustrated in the accompanying drawings, and Figure 1 shows a side elevation of an automobile with the emergency brake in traveling position;

Figure 2 shows a bottom plan view of Figure 1;

Figure 3 shows a bottom plan view of the emergency brake in housed position together with the frame therefor;

Figure 4 shows a longitudinal section along line 4—4 of Figure 3;

Figure 5 shows a fragmentary side elevation of the device in operation;

Figure 6 shows an inverted, fragmentary, perspective view of the frame;

Figure 7 shows a transverse section along line 7—7 of Figure 3, and

Figure 8 a side elevation of the actuating treadles for the brake.

In the drawings, reference numeral 10 represents a motor vehicle, under the bottom of which an emergency brake is carried. Reference numeral 11 represents the rear wheels of the vehicle, an emergency brake being provided for each of these wheels.

The emergency brake is carried in a frame or casing 12 consisting of a pair of parallelly arranged channel bars 13 connected by means of braces 14. The inner edges 16 of the top sides of these channel bars are spaced apart as at 15, as best seen in Figure 3. Within each channel bar is slidably mounted a tubular carrier 17 provided with an ear 18 projecting downwardly through a slot 19 provided in the bottom side of the channel bar 13, so as to permit longitudinal displacement of the ear 18 in said slot. A corresponding ear 20 is provided on the under side of each of the channel bars 13 and between these two ears a coiled tension spring is inserted with its ends engaging the respective ears and tending to draw the tubular carrier 17 in the direction of the arrow X, see Figure 5.

The rear end of each tubular carrier 17 is provided with a bearing 22 for a transverse spindle 23 revolubly mounted therein; this spindle carries, midway between the two bearings, a sprocket wheel 24 around which an endless chain 25 is mounted, the other end of the chain being similarly mounted on a second sprocket wheel 26 carried on a shaft 27 in bearings 28 furnished near the forward end of each tubular carrier 17. In this manner the chain 25, which is seen through the space 15 between the channel bars 13, is held permanently taut, because the distance between the two spindles 23 and 27 is constant. In this manner a slide, consisting of the tubular carriers 17 and the spindles 23 and 27, is furnished, which is guided in the channel bars 13.

The inner side of each tubular carrier 17 is partly cut away to provide a guide 29 for a short sleigh 30. Between the two sleighs 30 are carried two transverse bars 31 and 32 rigidly secured therein. On the rearmost bar 31 are journaled a pair of arms 33, which at their extreme rear ends carry, between them, a shoe 34 journaled thereon, as at 35. This shoe has a plurality of arcuate bands 36 curved to fit the periphery of the hind wheel 11 and these bands are preferably reinforced by short chains 37, enclosing the underside of the arcuate bands 36.

The arms 33 engage the rear ends of a pair of coiled springs 38 wound around the transverse shaft 31 and the springs engage with their forward ends 39, the transverse shaft 32, in such a manner that the springs tend to lift the arms 33 into housed position in the frame 12. As the guide 29 is of considerable length, the sleigh 30 will be permitted to slide a considerable distance to the rear, in the tubular carriers 17, so that the shoe 34 may engage the hind wheel 11 and be carried to the lower most point of the wheel, as indicated by dotted lines in Figure 5.

Lugs 40 are shown on the under side of the tubular carriers 17 and on these lugs are pivoted a pair of connecting rods 41 extending forwardly in the frame and engaging with their foremost ends, as at 42, a short arm 43, mounted to oscillate in bearings 44, furnished on the under side of the channel bearings 13, by means of a rocking shaft 45. Upon this rocking shaft is secured a two-armed lever 46, at the free ends of which are pivoted a releasing treadle 47 and a resetting treadle 48, which extend upwardly through the floor of the vehicle in a suitable position for convenient operation by the driver.

On each side of the sprocket wheel 24 are radial wings 50, which extend beyond the teeth of the sprocket wheel. These wings are intended to come in contact with the tread of the hind wheel 11, when the slide carries the sprocket wheel with the chain, to the rear, so that the hind wheel will rotate the sprocket wheel and draw the chain in the direction of the arrow Y in Figure 5, when the automobile is going in forward direction. To the chain is attached, in any suitable manner, as for instance through the intermediary of the transverse shaft 31, the sleigh 30. Accordingly, the sleigh will be driven in rearward direction of the chain through the intermediary of the sprocket wheel 34 and the wings 50 engaging the hind wheel 11.

It will thus be understood that the slide, consisting of a tubular carrier 17, has only a short rearward travel actuated by the tension springs 21 upon being released by the treadle 47, while the sleigh 30 receives a much longer travel in order to permit the shoe 34 to be dragged under the hind wheel 11 into the dotted position shown in Figure 5.

The operation of the device is as follows: With the emergency brake in housed position, as indicated in Figures 1, 2, and 4, when the treadle 47 stands in its raised position and the arm 43 lifted, so that the fulcrum point 42 of the connecting rods 41 is above the dead center, then the emergency brake is consequently locked in housed position. When the driver thereupon, with his foot, presses down the treadle 47, the fulcrum point 42 swings past the dead center thus permitting the springs 21 to draw the slide including the tubular carriers 17, sprocket wheels 24, chain 25 and sleigh 30, in rearward direction. The wings 50 will then be held in contact with the tread of the hind wheel 11 by the springs 21, as indicated in Figure 5. The hind wheel 11 will now compel the sprocket wheel 24 to operate the chain in the direction of the arrow Y and draw the sleigh 30 still further to the rear, until the shoe 34 becomes engaged by the hind wheel 11, as seen in full lines in Figure 5. Through the cooperation of the wings 50 and the direct engagement between the shoe 34 and the hind wheel 11, the shoe will now be dragged downwardly under the wheel, until it takes its ultimate position, indicated by the dotted lines in Figure 5, directly under the wheel, in this manner raising the latter from the ground. The vehicle will in this manner be stopped in a very short time. It is evident that the springs 38, which tend to press the shoe 34 tightly against the hind wheel 11 assist in the operation of the device at this time.

In order to return the emergency brake into housed position the motor should be reversed and the car backed slightly until the shoe 34 is lifted from the ground, the hind wheel 11 now reverses the motion of the chain 25 assisted by the wings 50, so that it will run in opposite direction of the arrow Y in Figure 5, and in this manner return the sleigh 30 into its forward position, whereupon the driver, by pressing upon the treadle 48, will return the slide into its former position against the action of the coiled springs 21 and disengage the wings 50 from the hind wheel 11.

This brake is very efficient and as it is entirely independent of the exertion of the operator it is very safe, being actually operated directly by the hind wheels of the car. All the driver has to do, is to release the brake by a slight pressure of his foot, when the brake will apply itself to raise the hind wheels from the ground. The heavier the car and the greater its speed at the time of operation, the surer the brake will act.

The brake is very simple to reset, requiring only the backing of the car and the pressure of the driver's foot for returning it into housed position, the driver remaining all the time in the seat.

Having thus described the invention, what is claimed as new is:

1. An emergency brake for wheeled vehicles comprising a brake shoe, an arm carrying said shoe, a sleigh suitably guided on the vehicle, said arm being pivoted on the sleigh, and means actuated by a vehicle wheel adapted to place the brake shoe in operative position.

2. An emergency brake for wheeled vehicles comprising a brake shoe, an arm carrying said shoe, a sleigh suitably guided on the vehicle, said arm being pivoted on the sleigh, means actuated by a vehicle wheel adapted to place the brake shoe in operative position, and other means for retracting said first means from contacting with said vehicle wheel.

3. An emergency brake for wheeled vehicles comprising a brake shoe, an arm carrying said shoe, a sleigh suitably guided on the vehicle, said arm being pivoted on the sleigh, means actuated by a vehicle wheel adapted to place the brake shoe in operative position, and other means adapted to hold said brake shoe in inoperative position.

4. An emergency brake for wheeled vehicles comprising a brake shoe, an arm carrying said shoe, a sleigh suitably guided on the vehicle, said arm being pivoted on the sleigh, means actuated by a vehicle wheel adapted to place the brake shoe in operative position, and other means adapted to hold said brake shoe in housed position; said first means including a friction roller, an element tending to press the roller against said vehicle wheel and an endless chain drive connecting said friction roller with said sleigh.

5. An emergency brake for wheeled vehicles comprising a brake shoe, an arm carrying said shoe, a sleigh suitably supported on the vehicle, said arm being pivoted on the sleigh, means actuated by a vehicle wheel adapted to place the brake shoe in operative position, and other means adapted to hold said brake shoe in housed position, said first means including a friction roller, an element tending to press the roller against said vehicle wheel, an endless chain drive connecting said friction roller with said sleigh, and a carrier for said friction roller, said carrier constituting a track for said sleigh.

6. An emergency brake for wheeled vehicles comprising a brake shoe, an arm carrying said shoe, a sleigh suitably supported on the vehicle, said arm being pivoted on the sleigh, means actuated by a vehicle wheel adapted to place the brake shoe in operative position, and other means adapted to hold said brake shoe in housed position; said first means including a friction roller, an element tending to press the roller against said vehicle wheel, an endless chain drive connecting said friction roller with said sleigh, a carrier for said friction roller, said carrier constituting a track for said sleigh and having a limited, longitudinal movement on the vehicle, and a spring tending to place the carrier in position permitting contact between said friction roller and said vehicle wheel.

7. An emergency brake for wheeled vehicles comprising a brake shoe, an arm carrying said shoe, a sleigh suitably supported on the vehicle, said arm being pivoted on the sleigh, means actuated by a vehicle wheel adapted to place the brake shoe in operative position, and other means adapted to hold said brake shoe in housed position; said first means including a friction roller, an element tending to press the roller against said vehicle wheel, an endless chain drive connecting said friction roller with said sleigh, a carrier for said friction roller, said carrier constituting a track for said sleigh and having a limited, longitudinal movement on the vehicle, a spring tending to place the carrier in position permitting contact between said friction roller and said vehicle wheel; said other means including a lever fulcrumed on the vehicle for oscillating in the length direction of the vehicle, positive connection between said lever and said carrier, and elements arranged for manipulation of said lever to set it into locked and unlocked positions respectively.

In testimony whereof I affix my signature.

JAMES W. ORR. [L. S.]